Patented Feb. 5, 1924.

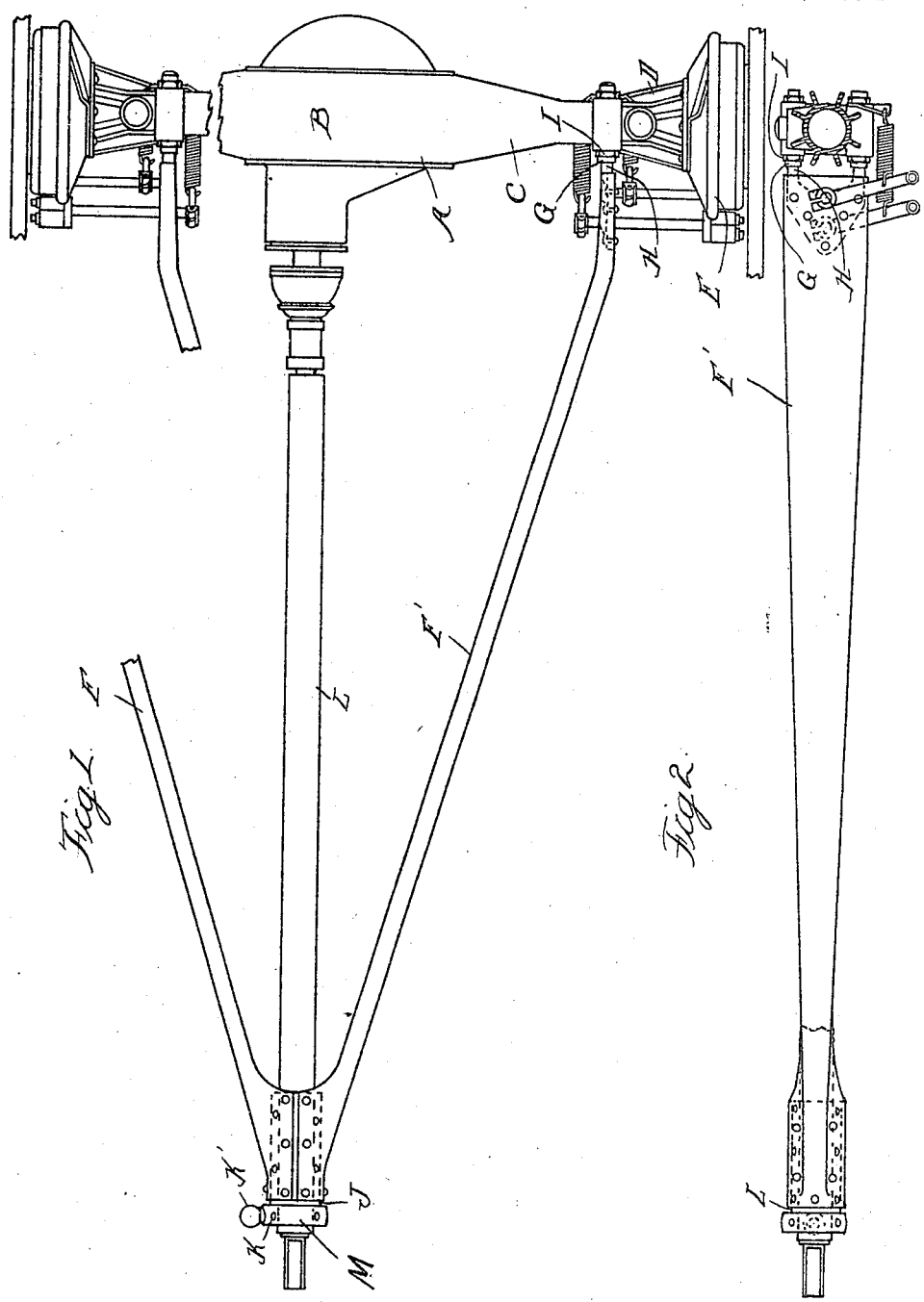

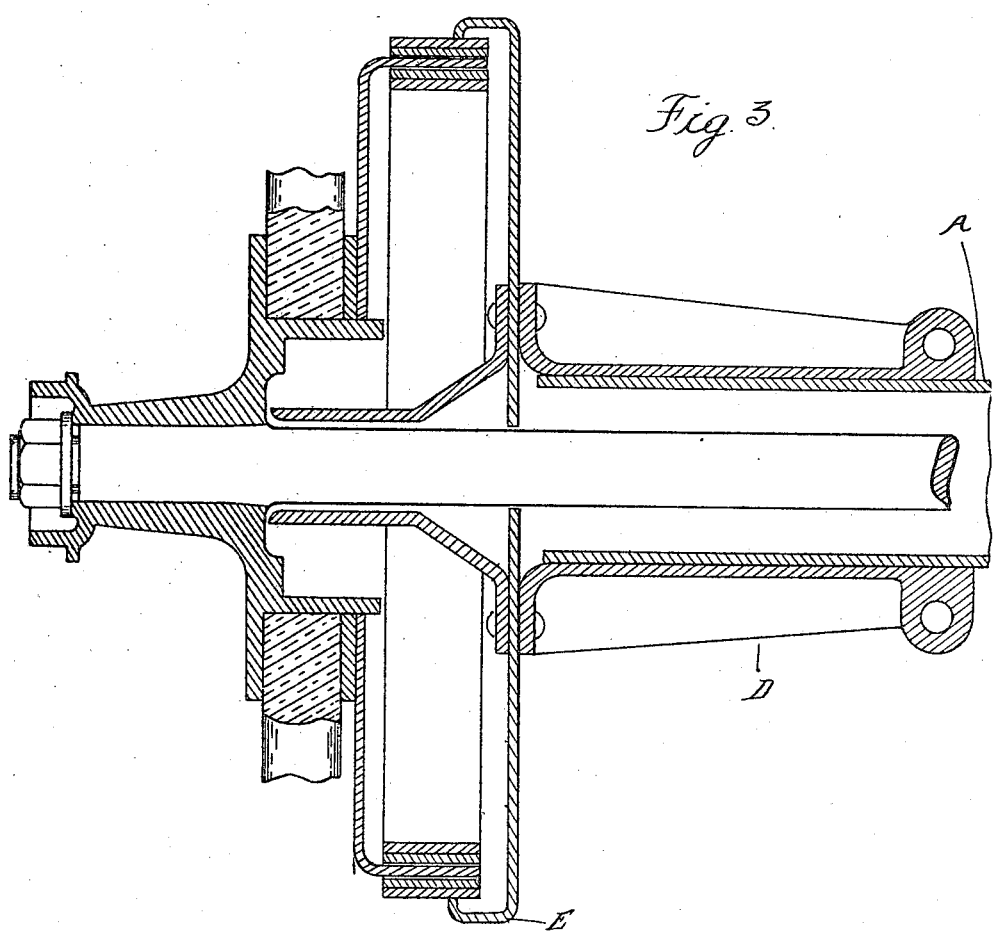

1,482,577

UNITED STATES PATENT OFFICE.

OWEN M. NACKER, OF DETROIT, MICHIGAN, ASSIGNOR OF ONE-HALF TO ALANSON P. BRUSH, OF DETROIT, MICHIGAN.

REAR AXLE.

Application filed June 4, 1917, Serial No. 172,815. Renewed December 3, 1920. Serial No. 428,153.

*To all whom it may concern:*

Be it known that I, OWEN M. NACKER, a citizen of the United States of America, residing at Detroit, in the county of Wayne and State of Michigan, have invented certain new and useful Improvements in Rear Axles, of which the following is a specification, reference being had therein to the accompanying drawings.

The invention relates to axle constructions for motor vehicles of that type provided with a torque arm pivotally connected to the vehicle frame and taking care of both driving and braking torque. With such constructions the driving torque is due to the reaction of the bevelled gear connection between the propeller-shaft and the live axle which is usually located centrally of the axle housing. On the other hand, the braking torque is directly applied to the ends of the axle housing on which the brake-heads are located. Thus where the torque arm is connected to the central portion of the axle housing it will directly take care of the driving torque, but the braking torque, which is more severe, must be transmitted through the axle housing from the ends thereof to the center. This necessitates sufficient strength in the construction of the housing to safely carry the maximum braking stresses. It is the primary object of the present invention to simplify, cheapen and lighten the axle construction by employing a pair of torque arms connected to the axle near the opposite ends thereof and converging as they extend forward to a common point of connection to the vehicle frame. Thus the braking torque is transmitted directly to these torque arms without being carried through the central portion of the axle housing, and as the maximum driving torque is always less than the maximum braking torque the lighter axle housing will safely take care of the same.

In the drawings:

Figure 1 is a plan view of my improved construction;

Figure 2 is a side elevation thereof;

Figure 3 is a longitudinal section in the plane of the axle.

A is the axle housing, which has the central enlargement B for receiving the differential gearing (not shown) and the tapering portions C extending towards the opposite ends. D are end members for the axle housing which are of stronger and heavier construction and are directly connected with the brake-heads E. These members D, as shown, are sleeved upon end portions of the housing A, which latter is preferably formed of relatively light pressed sheet-metal construction. F and F' are torque arms preferably of channel bar construction, which at their rear ends are provided with means of attachment to the members D, such for instance as the forgings G having the parallel rods or furcations H extending through eyes in the members D above and below the axle. The furcations H may be threaded to engage clamping nuts I, by which they are secured to the members D. The forward portions of the torque arms F F' converge and at their forward ends are attached to a tubular member J having a laterally-extending arm K with a spherical end K'. The spherical portion K' is adapted for engagement with a socket upon the frame and will provide for universal pivotal movement of the torque arms in relation thereto. L is the propeller-shaft which passes through the tubular member J and is provided with a universal joint M in transverse axial alignment with the spherical member K'.

In use, whenever the brakes are applied the torque will be transmitted to the members D and carried directly therefrom through the bifurcated member H into the torque arms F and F' without passing through the central portion of the axle A. As this relieves the axle from violent torque stresses it can be much lighter than where the arm is centrally arranged.

What I claim as my invention is:

1. A vehicle axle, comprising a central portion formed of pressed sheet-metal, reinforced end portions for directly connecting with the brake-heads, and a pair of torque arms connected to said reinforced portions converging forwardly and having a common point for connection with the vehicle frame.

2. A vehicle axle, comprising a central portion formed of pressed sheet-metal, reinforced end portions for direct connection to the brake-heads, a pair of torque arms connected to said reinforced portions and converging forwardly, a tubular member connected to the forward ends of said torque member, a propeller shaft passing through said tubular member, and an arm extending laterally from said tubular member for pivotal connection with the frame.

3. A vehicle axle, comprising a pressed sheet-metal housing having an enlarged central portion and tapering end portions, reinforcing members engaging said end portions and connected directly to the brake-heads, a pair of channel section torque arms respectively connected to said reinforcing members, the forward portions of said torque arms converging, a tubular member embraced by the forward ends of said torque arms and secured thereto, a propeller shaft passing through said tubular member, and a laterally-extending arm on said tubular member terminating in a spherical portion for pivotal engagement with the vehicle frame.

4. A vehicle axle comprising a central portion, reinforcements at opposite ends thereof for directly connecting with the brake-heads, and a pair of torque-arms connected to said reinforcements converging forwardly and having a common point for connection with the vehicle frame.

5. A vehicle axle, comprising a pressed sheet-metal housing having an enlarged central portion and tapering end portions, reinforcing members engaging said end portions and connecting directly to the brake-heads, a pair of channel section torque-arms respectively connected to said reinforcing members, the forward portions of said torque-arms converging and being secured to each other, a propeller-shaft passing through the attached portions of said torque-arms and an arm extending laterally from said torque-arms terminating in a spherical portion for pivotal engagement with the vehicle frame.

6. A vehicle axle, comprising a central portion formed of pressed sheet-metal, reinforced end portions for direct connection to the brake-heads, provided with eyes at their lower and upper sides, and a pair of torque arms connected to said reinforced portions and extending forwardly for connection with the frame, said arms being provided with furcations for engaging the respective eyes in said reinforced end portions.

7. The combination with a vehicle axle, comprising a central portion formed of pressed sheet-metal, a brake-head at the outer end thereof, and a reinforcing member between said brake-head and central portion, of a torque arm connected to said reinforcing member and adapted for connection with the vehicle frame.

8. A vehicle axle, comprising a housing for the differential mechanism and live axle, provided at each end with a brake head, a member for connection with a vehicle frame at a point thereof and convergent torque arms each rigidly connected to the member and to a brake head.

9. A vehicle axle, comprising a housing for the differential mechanism and live axle having reinforced end portions on each of which a brake head is secured, convergent torque arms each rigidly secured to a brake head by the companion reinforcement and a member for pivot connection with the vehicle frame held in rigid spaced relation to the housing by the torque arms.

10. A vehicle axle, comprising a housing for the differential mechanism and live axle provided at each end with a brake head, convergent torque arms each rigidly connected to a brake head and a longitudinally apertured member transversely disposed to the housing and secured in spaced relation thereto by the torque arms, the member forming a pivot connection for attachment to the frame of the vehicle.

11. A vehicle axle, comprising an axle housing having brake heads at the opposite ends thereof and a pair of torque arms rigidly connected to said brake heads and provided with a common means of connection with a vehicle frame at the forward convergent ends.

12. A vehicle axle, comprising a metal body formed of pressed sheet metal, reinforced end portions, brake heads secured on the end portions, a pair of torque arms rigidly secured to said reinforced portions, a tubular member connected to the forward convergent end portions of the torque arms and an arm extending laterally from said tubular member for pivotal connection with the vehicle frame.

13. A vehicle axle, comprising a pressed sheet metal housing having an enlarged central portion and tapering end portions for housing the differential mechanism and live axle, a reinforcing member sleeved on each end portion, brake heads directly secured to the reinforcements, a pair of torque arms each connected at one end to a reinforcing member, a tubular member transversely disposed to the housing and secured in spaced relation thereto by the forward convergent end portions of the torque arms, and a laterally extending arm on said tubular member having a spherical portion for pivotal engagement with the vehicle frame.

14. A vehicle axle, comprising a central sheet metal portion with oppositely extending end portions, reinforcements sleeved on said end portions, brake heads secured to the reinforced portions and a pair of torque arms connected to the reinforced portions and extending forwardly and convergently for connection with the vehicle frame, said arms each being provided with furcations engaging eyes formed in the lower and upper sides of a reinforcement.

In testimony whereof I affix my signature.

OWEN M. NACKER.